United States Patent [19]

Oda et al.

[11] Patent Number: 4,847,644
[45] Date of Patent: Jul. 11, 1989

[54] IMAGE FORMATION DEVICE

[75] Inventors: Goro Oda; Takashi Shiraishi, both of Kanagawa, Japan

[73] Assignee: Kabushiki Kaisha Toshiba, Kawasaki, Japan

[21] Appl. No.: 155,078

[22] Filed: Feb. 11, 1988

Related U.S. Application Data

[63] Continuation of Ser. No. 911,990, Sep. 26, 1987.

[30] Foreign Application Priority Data

Sep. 30, 1985 [JP] Japan ................................ 60-218406

[51] Int. Cl.⁴ ............................................. G01D 15/00
[52] U.S. Cl. ..................................... 346/160; 350/6.8
[58] Field of Search .................. 346/160, 107 R, 108; 350/6.8, 6.9, 6.91; 355/8; 358/300, 302; 400/119; 101/DIG. 13

[56] References Cited

U.S. PATENT DOCUMENTS 4,030,806 6/1977 Goshima et al. ..................... 350/6.8
4,496,209 1/1985 Itoh et al. .............................. 350/6.8
4,612,555 9/1986 Horgon et al. ....................... 346/160

FOREIGN PATENT DOCUMENTS 0050425 4/1982 European Pat. Off. ............ 346/160
0123425 10/1984 European Pat. Off. ............ 346/160

Primary Examiner—Arthur G. Evans
Attorney, Agent, or Firm—Finnegan, Henderson, Farabow, Garrett, & Dunner

[57] ABSTRACT

An image formation device for forming an electrostatic latent image on a photosensitive body using a semiconductor laser to generate a laser beam, a collimating lens for focusing the laser beam into a parallel beam, a collimating lens unit which is rotatable and arranged to flatten the laser beam from the collimating lens, a polygonal mirror for scanning the laser beam by means of reflecting surfaces, and a first and a second scanning lens for cooperatively scanning the optical path for moving the beam from the polygonal mirror onto the photosensitive body at a constant speed.

15 Claims, 4 Drawing Sheets

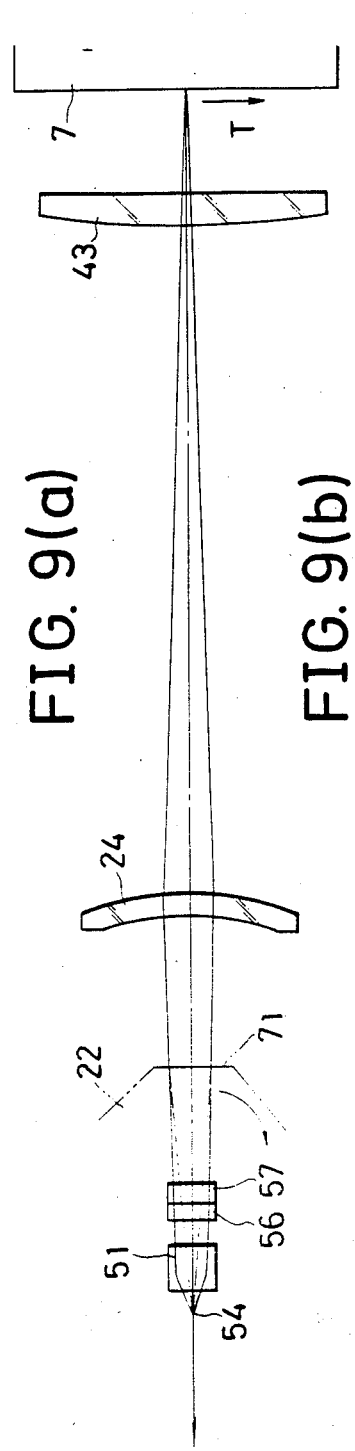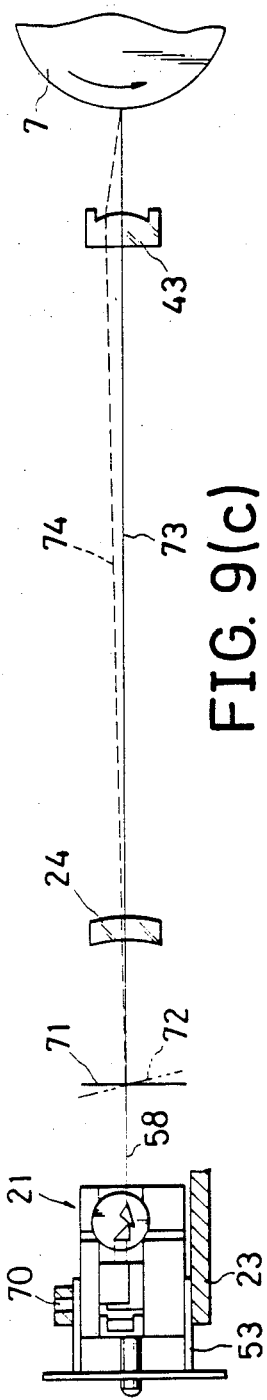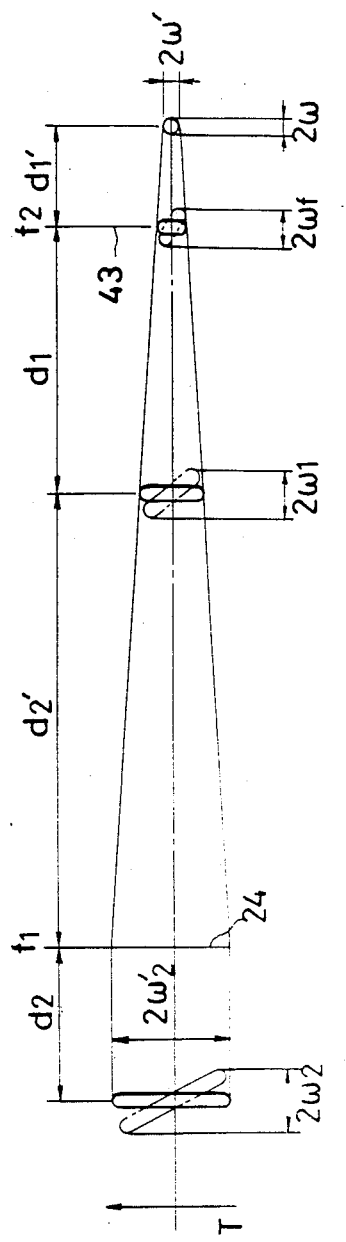

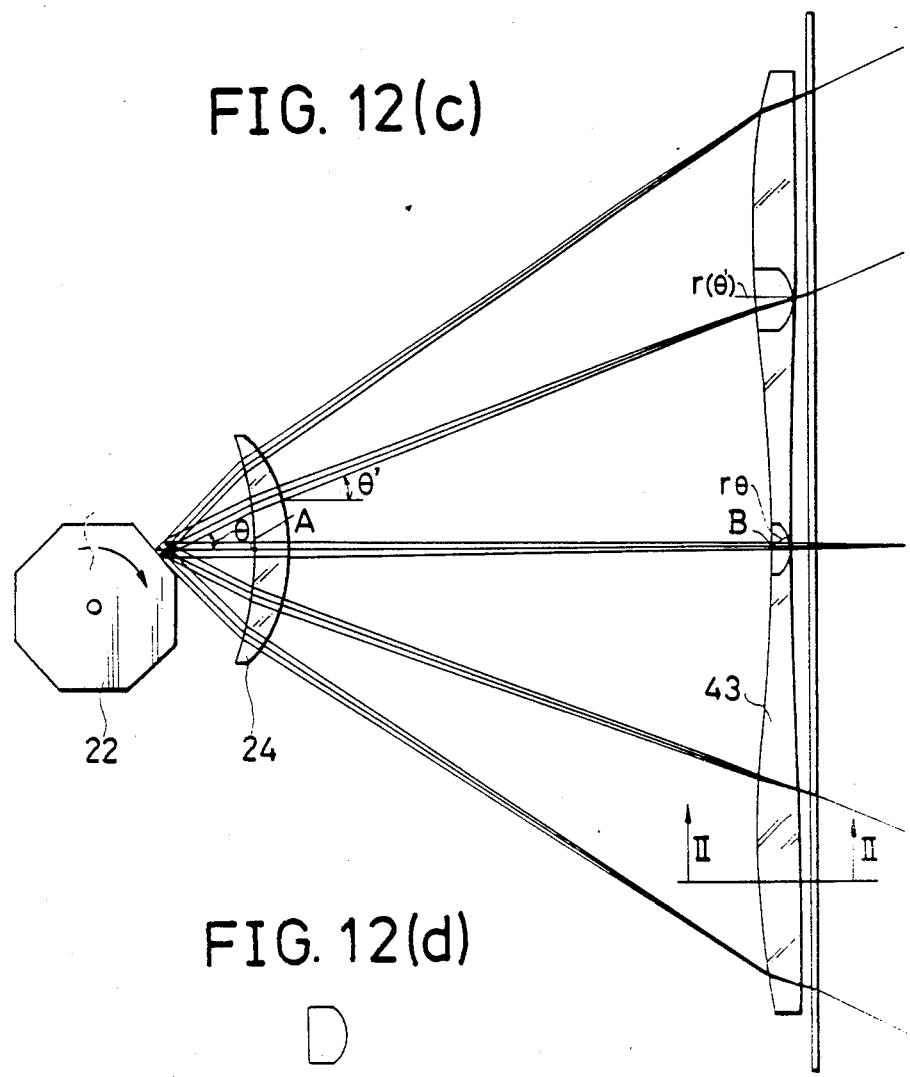

IMAGE FORMATION DEVICE

This is a continuation of application Ser. No. 911,990, filed Sept. 26, 1987.

BACKGROUND OF THE INVENTION

1. Field of the Invention

The present invention relates especially to the laser beam optical scanning system of an image formation device which forms an electrostatic latent image on the photosensitive body by means of a laser beam.

2. Description of the Prior Art

The conventional image formation apparatus for laser beam printer and similar devices has a laser beam optical scanning system which scans across the surface of a photosensitive body with a laser beam that is radiated from a semiconductor laser or the like, wherein the sagittal image surface of the laser beam optical scanning system generally has a large bending. Moreover, the laser beam optical scanning system has a drawback in that the correction rate for the tilt of the mirror facets that are used in the laser beam optical system is reduced. Further, it was not possible to realize a satisfactory $f\theta$ characteristic, where f is the focal length and $\theta$ is the scanning angle, for the existing optical scanning system, since the distortion becomes as large as 0.3% to 1.2%.

Accordingly, it has not been possible to form an image with high accuracy.

SUMMARY OF THE INVENTION

An object of the present invention is to provide an image formation device which is capable of preventing the deterioration in the correction rate for the facet tilt.

Another object of the present invention is to provide an image formation device which can realize ideal $f\theta$ characteristic that does not generate distortion.

Another object of the present invention is to provide an image formation device which is capable of preventing a reduction in the correction rate of beam deflection due to the deflector for the laser beam optical scanning system.

Another object of the present invention is to provide an image formation device which is capable of completely eliminating the bending of the sagittal image surface.

A special feature of the present invention is that in an image formation device that comprises a semiconductor laser which generates a laser beam for forming an electrostatic latent image on the surface of a photosensitive body, a collimating lens for arranging the laser beam to be parallel each other, a flattening means for flattening the laser beam from the collimating lens, a scanning means for deflectively scanning the laser beam from the flattening means in the main scanning direction, and an image formation device which has a first and a second scanning lenses that work cooperatively to correct the light path so as to move the laser beam from the scanning means on the surface of the photosensitive body at a constant speed, the present device is characterized in that the first scanning lens is arranged on the deflecting means side of the midpoint of the optical path between the scanning means and the surface of the photosensitive body, the second scanning lens is arranged on the photosensitive body side of the midpoint of the optical path between the scanning means and the surface of the photosensitive body, and the second scanning lens has a predetermined power in the main scanning direction and a power in the sub-scanning direction which is at least several times the power in the main scanning direction.

These and other objects, features and advantages of the present invention will be more apparent from the following description of a preferred embodiment, taken in conjunction with the accompanying drawings.

BRIEF DESCRIPTION OF THE DRAWINGS

FIG. 8 (c) is a circuit diagram for the horizontally synchronized signal detection element unit shown in FIG. 8 (a).

FIG. 9 (a) is a diagram for explaining the relation between the squeezing of the beam in the main scanning direction and each of the optional parts, FIG. 9 (b) is a diagram for explaining the sub-scanning direction and the correction for the tilting of the surface of the polygonal mirror in the laser beam optical scanning system shown in FIG. 4, FiG. 9 (c) is a diagram for explaining the beam diameter and the principle of beam diameter correction for each of the paths in the main scanning and sub-scanning directions of the laser beam optical scanning system shown in FIG. 4.

DESCRIPTION OF THE PREFERRED EMBODIMENT

Figure 1:
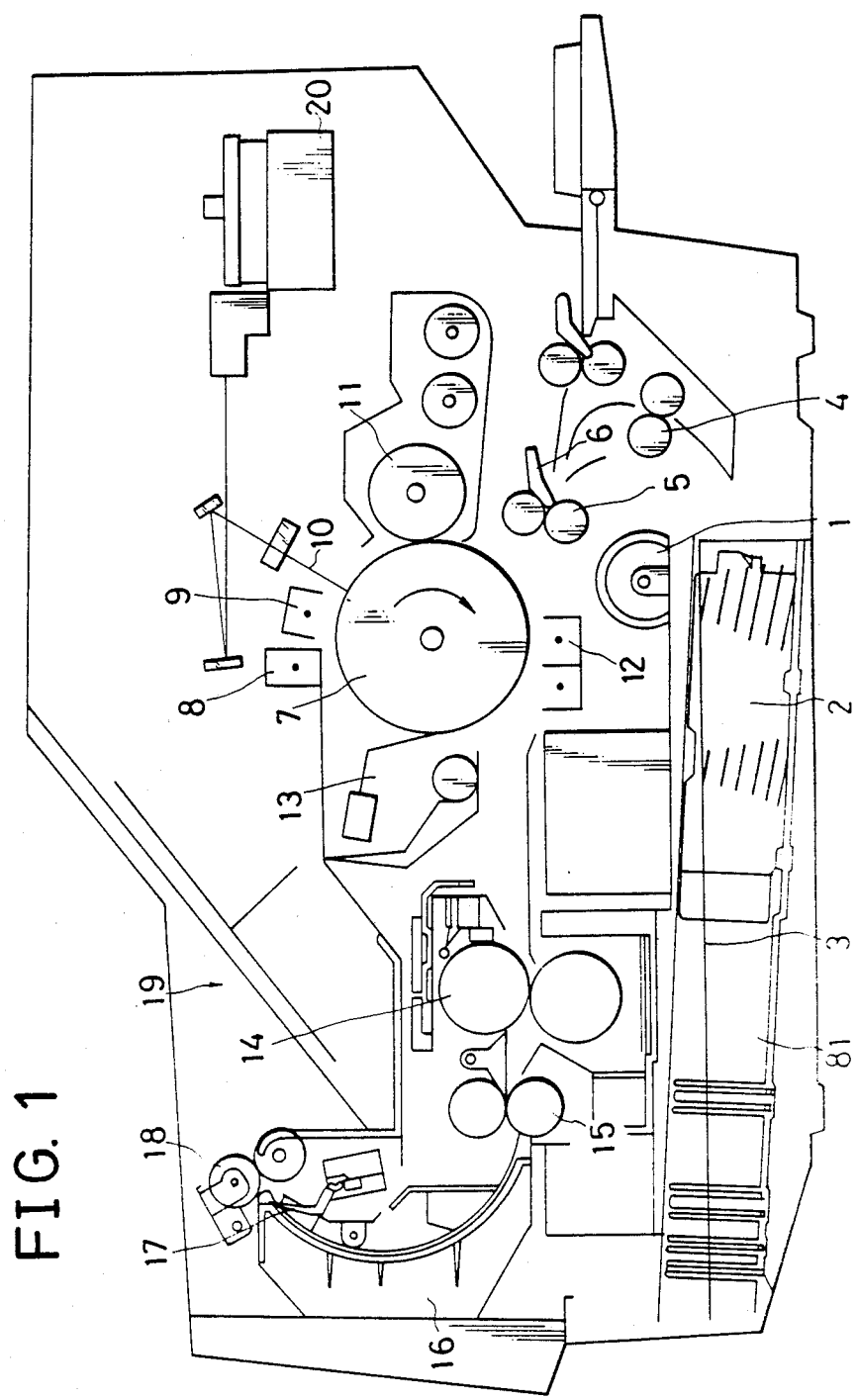
FIG. 1 is a schematic sectional view of an image formation device embodying the present ivnention, FIGS. 2 (a) and 2 (b) are diagrams for explaining the mounting method of the first scanning lens of the device embodying the present invention.

Referring to FIG. 1, there is shown an image formation device embodying the present invention. The image formation device has a recording paper housing unit 81 for housing recording papers (referred to as the papers hereinafter) that is provided in the bottom part of the device shown in the figure, and a paper feeder roller 1, shown in the upper right of the paper housing unit 81, for fetching and transporting the paper 3 that is housed in the paper housing unit 81, and the paper is fetched and transported one by one to the interior of the main body of the device by the paper feeder roller. Reference numeral 2 is a pressing member for the paper 3 for pressing upward the paper 3 that is housed in the paper housing unit 81 to facilitate the fetching and transportation of the paper 3 by the paper feeder roller 1. In the stage succeeding the paper feeder roller 1, there are provided a set of transporting rollers 4 that hold the transportation path of the paper 3, and in the stage that follows the transporting rollers 4 there are provided similarly a set of resister rollers 5. On the resister rollers 5 there is attached a stop switch 6 which measures the timing of the papers 3 that are transported from the paper housing unit 81.

In the stages that follow the resister rollers 5 there are provided a photosensitive body 7, a developing agent bearer 11 that supplies the developing agent to the photosensitive body 7, a charger 9 which gives electric charge to the photosensitive body 7 to hold the developing agent, a transcriber 12 which generates an electric field between the photosensitive body 7 for transferring the developing agent that is held on the photosensitive body 7 to the paper 3 that is transported, a charge removing lamp 8 which removes the residual charge that remain on the photosensitive body 7, and a cleaner 13 which removes the residual developing agent on the photosensitive body 7. The photosensitive body 7 is irradiated with laser light 10 which is generated by a laser scanning unit 20 to record information as grain images of the developing agent. In the stage following the photosensitive body 7 there is provided a fixer 14 which fixes the information transferred onto the paper 3 from the photosensitive body 7, and following the fixer 14 there are provided paper ejecting rollers 15, a paper ejecting guide 16, a paper ejecting switch 17, paper ejecting rollers 18, and a tray for ejected paper 19 which receives the paper 3 that is ejected.

The operation of the image formation device with the above configuration will now be described.

The papers 3 that are housed in the paper housing unit 81 are picked up and transported one by one by the paper feeder roller 1 to be held between the transporting rollers 4 in the next stage. The paper 3 that is held between the transporting rollers 4 is transported to the resister rollers 5 that are in the next stage, where it turns on the contact of the stop switch 6 which is placed in front of the resister rollers 5. The stop switch 6 checks whether or not the paper 3 is transported normally. If the contact is not brought to the on-state within a predetermined time, the switch 6 judges that the paper 3 is jammed in the device and interrupts the irradiation of the laser light 10 on the photosensitive body 7. Next, the paper 3 that is held between the resister rollers 5 is transported to the underneath of the photosensitive body 7, by keeping synchronism with the photosensitive body 7. The surface of the photosensitive body 7 is electrically charged uniformly by the charger 9. Then, information is formed on the surface as electrostatic latent images by the laser light that is irradiated from the laser scanning unit 20, based on the signals from the control unit that is not shown, and the developing agent that is supplied from the developing agent bearer 11 is attached there corresponding to the information. The information formed on the surface of the photosensitive body 7 in this manner is transferred to the paper 3 that is transported between the transferrer 12 and the photosensitive body 7, by the action of an electric field generated between the photosensitive body 7 and the transferrer 12 that is provided beneath the photosensitive body 7. Further, developing agent attached to the surface of the photosensitive body 7 is removed by the cleaner 13 which is provided in the periphery of the surface of the photosensitive body 7. After the residual charge on the surface of the photosensitive body 7 is removed by the charge removal lamp 8, the surface is charged uniformly by the charger 9, preparing for the next transfer operation.

The grain information transferred to the surface of the paper 3 is fixed by the fixer 14, and then the paper is ejected on the paper ejecting tray 19 via the paper ejecting rollers 15, the paper ejecting guide 16, and the paper ejecting rollers 18. Immediately before the paper ejecting rollers 18 there is attached a paper ejecting switch 17. When its contact fails to be brought to the on-state within predetermined time, it is judged that the paper 3 is jammed on the transporting path and the operation of the entire device is arranged to be brought to a stop.

Figure 3:
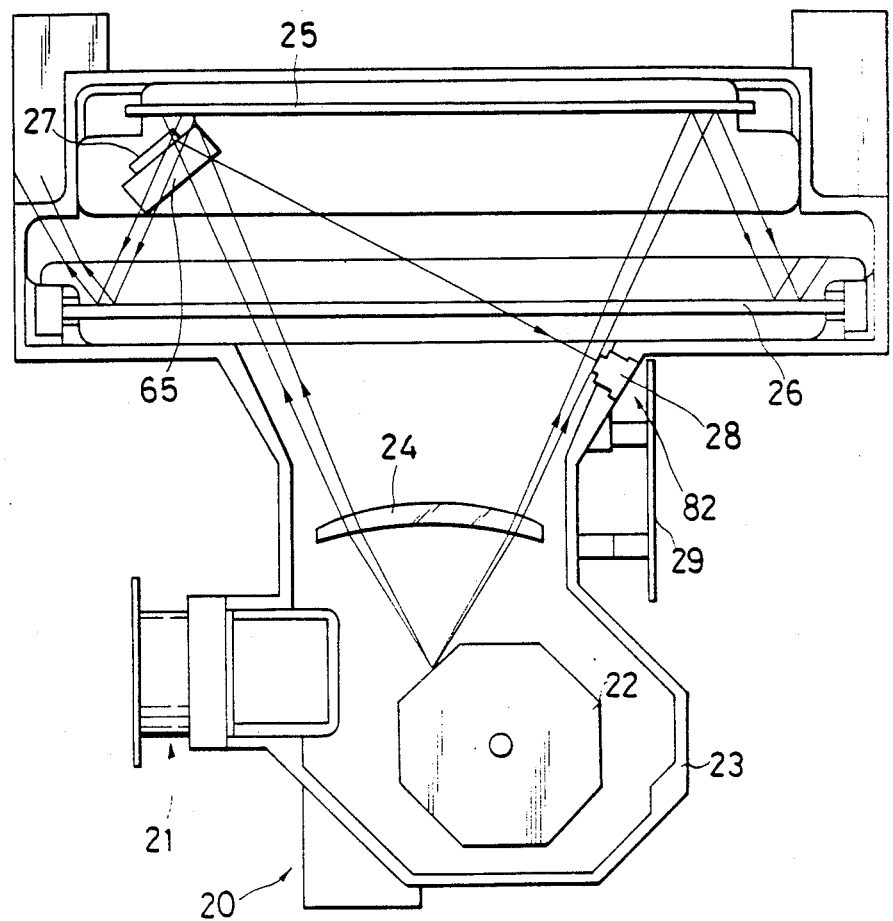
FIG. 3 is a plan view of the laser beam optical scanning system embodying the present invention.

FIG. 3 shows a plan view of the laser scanning unit 20.

The laser scanning unit 20 has a collimating lens unit 21 that generates a collimated laser light (also referred to as the laser beam hereinafter), a polygonal mirror 22 which is a scanning means that rotates at high speed while reflecting the laser light that is emitted from the collimating lens unit 21, a first scanning lens 24 which converges the laser light that is reflected by the polygonal mirror 22, and a first reflecting mirror 25 and a second reflecting mirror 26 which reflect the converged laser light so as to lead it to the photosensitive body 7. The laser light that is led via the first reflecting mirror 25 and the second reflecting mirror 26 consists of a second scanning lens 43 that is provided at a position near the photosensitive body 7 (see FIG. 4), a folding lens for horizontally synchronized signal 65, a horizontally synchronized signal reflecting mirror 27, and a horizontally synchronized signal receiver 28 that receives the horizontally synchronized signal from the folding lens for horizontally synchronized signal 65 and the horizontally synchronized signal reflecting mirror 27.

Figure 2A:
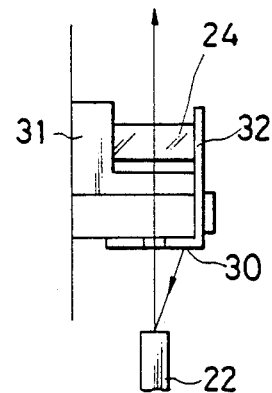
Figure 2B:
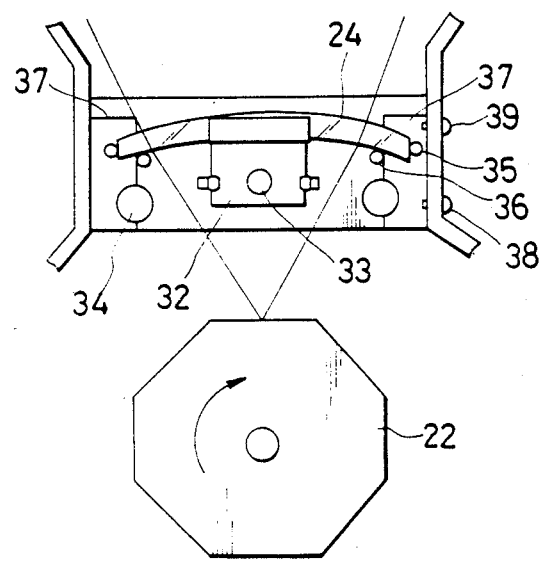

The first scanning lens 24 is fixed to the first scanning lens fixing plate 30 that has a slit for cutting down the stray light (see FIG. 5), as the details are shown in FIGS. 2 (a) and 2 (b), with the first scanning lens positioning members 35 and 36, to position its optical axis and the like. Further, the first scanning lens fixing plate 30 is fixed to an optical unit casing 23 by fixing screws 34. Moreover, the horizontal spring for fixing the first scanning lens 32 is energized to be pressed toward a first scanning lens supporting unit 31, on the first scanning lens fixing plate 30, by a horizontal spring fixing screw 33. Moreover, on the optical unit casing 23, the first scanning lens is fixed pressed toward the polygonal mirror 22 by two vertical springs 37 for fixing the first scanning lens that are fixed by a vertical spring fixing screw 38. In addition, the central parts of the vertical fixing springs 37 have notches to let the laser beam pass through without being obstructed. Further, the pressing power of the vertical fixing springs 37 on the first scanning lens 24 can be adjusted by the movable screw for vertical spring 39.

With a path constructed as in the above, information is recorded as electrostatic latent images on the photosensitive body 7 by the laser beam.

To obtain a horizontally synchronized signal at the initiating point of irradiation of the laser beam to be irradiated on the photosensitive body 7, there are provided a horizontally synchronized signal folding lens 65 and a horizontally synchronized signal reflecting mirror 27 at the end portion of the irradiated width of the laser beam, and the laser beam reflected from the horizontally synchronized signal reflecting mirror 27 impinges upon a horizontally synchronized signal detection unit 82 via the horizontally synchronized signal folding lens 65.

Figure 4:
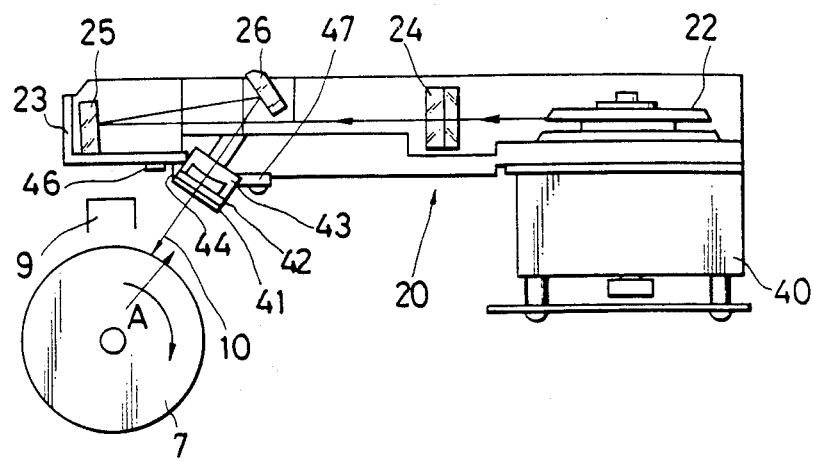
FIG. 4 is a schematic sectional view of the laser beam optical scanning system shown in FIG. 3.

In FIG. 4 is shown a sectional view of the laser beam scanning optical system embodying the present invention.

Referring to the figure, a second scanning lens 43 will be described. The second scanning lens 43 is pressed by a bar-like lens fixing plate 44 and fixed with a fixing plate fixing screw 46, on the bottom of the optical unit casing 23 which serves as the reference surface, via an elastic rubber 42 for absorbing the deformation in the second scanning lens 43 and a dust-preventive glass 41 for preventing dusts and others.

Figure 5:
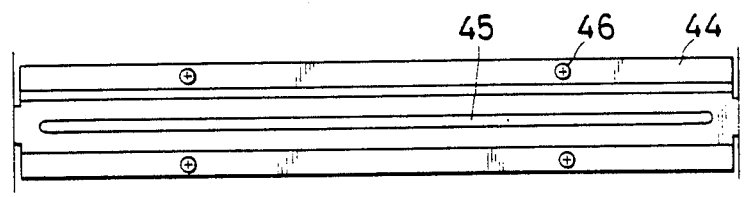
FIG. 5 is an exterior view of the fixing bracket of the second scanning lens shown in FIG. 4.

FIG. 5 shows an exterior view of the bar-like lens fixing plate 44 as seen from the direction of the arrow A of FIG. 4. At the central part of the bar-like lens fixing plate 44, there is provided an approximately rectangular slit for cutting down stray light 45. Since the second scanning lens is provided in this portion, the second scanning lens 43 is pressed and fixed via the elastic rubber 42 on the reference surface of the optical unit casing 23, as described above, without generating local stresses in the lens even when it is made of plastic, and it is possible to mount the second scanning lens so as to correct for the deformations that are characteristic to plastics even when there are deformations due to residual stresses in the lens.

Figure 6:
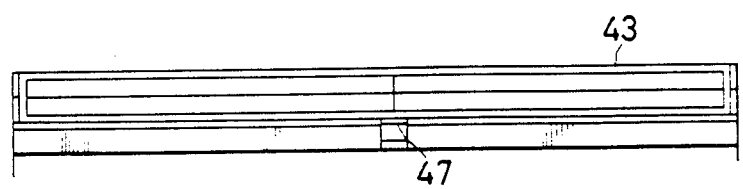
FIG. 6 is a plan view of the second scanning lens shown in FIG. 4, FIG. 7 (a) is a sectional view of the collimating lens unit shown in FIG. 3, FIG. 7 (b) is a side view of the collimting lens unit shown in FIG. 7 (a), FiG. 8 (a) is a plan view of the horizontally synchronized signal detection element unit shown in FIG. 3.

FIG. 6 shows the state in which the second scanning lens 43 is mounted on the notch provided in the optical unit casing 23 for inserting the second scanning lens 43.

As shown in the figure, in the second scanning lens 43 there is provided a projection 47 in the area that corresponds to the optical axis of the first scanning lens 24. The projection is for positioning the second scanning lens 43 by fitting the projection to a cavity provided on the optical unit casing 23. By fixing the second scanning lens 43 in the above manner, it is possible to distribute the influence due to thermal expansion in the lens 43 symmetrically with respect to the optical axis, so that the image characteristics such as the fθ characteristic of the image surface can be improved compared with conventional system that fixes one end of the lens.

Figure 7A:
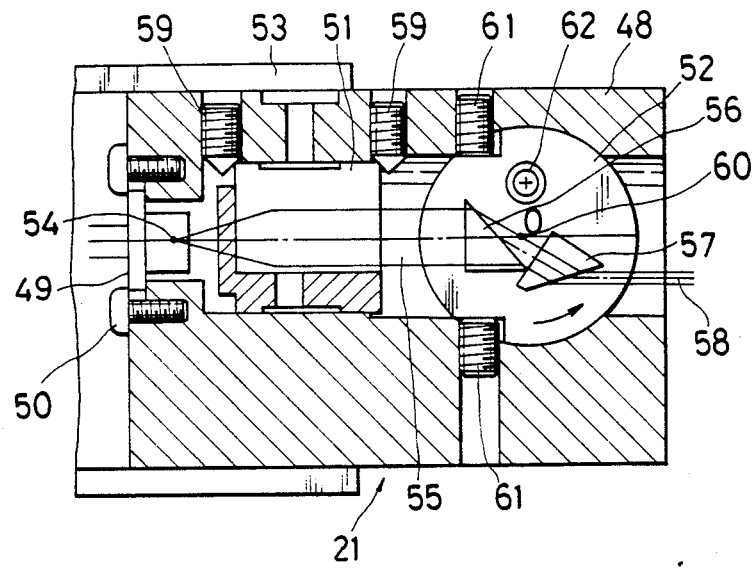
Figure 7B:
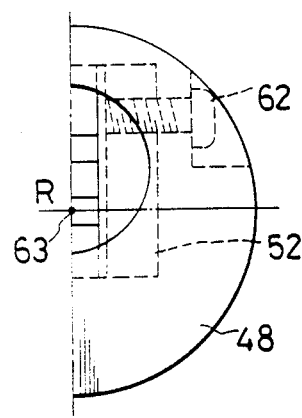

FIGS. 7 (a) and 7 (b) are sectional views that show the configuration of the collimating lens unit 21 shown in FIG. 3. In the figure, the collimating lens unit 21 has an exterior view of a cylinder. At about the center of the lens unit 21 it has a collimating lens holder 48 that has a cylindrical hollow section, and on one end of the cylindrical hollow section there are mounted a semiconductor laser 54 that generates a laser beam and a semiconductor fixing plate 49 on which is placed the semiconductor laser 54 so as to close the end of the hollow section with two fixing bolts 50. Further, in the cylindrical hollow section there are provided, in addition to the semiconductor laser 54, a collimating lens 51 that brings the laser beams that are generated by the semiconductor laser 54 parallel to each other, a first prism 56 and a second prism 57 (these two prisms form a beam compressor) which flatten the laser beams that are made parallel by the collimating lens 51, and a prism holder 52, with the first prism 56 and the second prism 57 mounted on it, that is installed freely turnably in the hollow section with the center line 60 as the center. Further, the prism holder 52 can be given fine adjustments by two adjusting bolts 61 that are provided at the positions facing each other with respect to the optical axis. These bolts make it possible to adjust the large deflection in the direction of emission of the flattened beam that used to be caused in the past even by a slight deviation in the collimated beam that impinges upon the first and the second prism. Moreover, the prism holder 52 can be fixed securely at an arbitrary position by a prism holder fixing bolt 62 that is provided at a position perpendicular to the plane on which are placed the first prism 56 and the second prism 57. Moreover, the collimating lens unit 21 is mounted freely turnably on a cylindrical insulating cover 53, with the laser beam that is flattened by the first prism 56 and the second prism 57 as the center. In addition, the bolts 59 in the figure are provided for fine adjustment of the mounted position of the collimating lens 51. The two collimating lens adjusting bolts 59 facilitates, for instance, the alignment of the optical axis.

In mounting the semiconductor laser 54 on the semiconductor fixing plate 49, there is usually generated an error of ±0.1 (mm) with respect to its mounting position. If the focal length of the collimating lens 51 is $f_0$ (mm) and the focal length of the first scanning lens 24 is f, the influence of the error in mounting error on the image surface on the photosensitive body 7 is magnified by $f/f_0$ times.

If the position where the laser beam that propogates along the optical axis of the collimating lens 51 focuses is considered the ideal imaging position, then the error in the imaging position will be $\pm(f/f_0)\times 0.1$ (mm) with respect to the ideal imaging position. At the same time, this will mean also that an error of $\pm(f/f_0)\times 0.1$ (mm) will be generated for both ends of the width of the laser beam that is scanned.

Therefore, in the present invention, the effective scanning width on the photosensitive body 7 is increased by $(f/f_0)\times 0.1$ (mm) on each of the ends from the maximum recording width, in other words, by $(f/f_0)\times 0.2$ (mm) in the width direction. This permits not only to make it possible to eliminate the structure that complicates the collimating lens unit itself, of alignment of optical axes of the semiconductor laser 54 and the collimating lens 51, but also to make it unnecessary to provide required delicate adjustments for the alignment.

The operation of the collimating lens unit with the above construction will now be described briefly.

The laser beam that is generated in the semiconductor laser 54 is made into a parallel beam by the collimating lens 51 that is placed in the front on the irradiating side of the semiconductor laser 54. The laser beam that is made parallel impinges next on the first and second prisms that form a beam compressor, and after being flattened there it is incident upon the polygonal mirror 22 that is not shown. Here, the prism holder 52 is made to be turnable with the laser beam that comes out of the beam compressor as the center, so that it becomes possible to adjust the direction of flattening of the laser beam that is incident upon the polygonal mirror 22 to an arbitrary direction, and hence it becomes possible to adjust the spot system of the laser beam in the sub-scanning direction that is perpendicular to the main scanning direction on the photosensitive body 7.

Namely, the first and the second prisms 56 and 57 are fixed by the fixing bolt 62 so as to have the relative position of the two prisms to be invariant, and the fixing bolt 62 is supported rotatably making internal contact with the holder 52. Accordingly, by rotating the fixing bolt 62 with respect to the holder 52, the first and the second prisms 56 and 57 can be rotated as a united body by keeping their relative position, making it possible to arbitrarily adjust the beam angle.

Figure 8A:
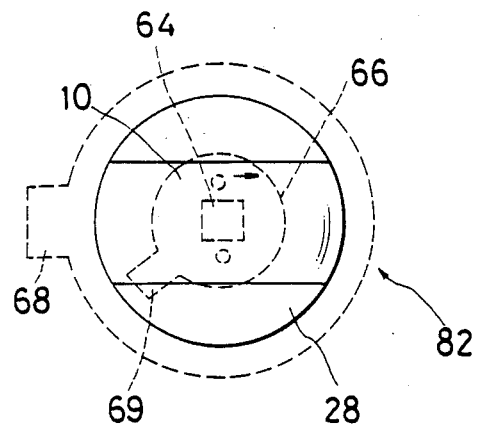
FIG. 8 (b) is a sectional view of the horizontally synchronized signal detection element unit shown in FIG. 8 (a).
Figure 8B:
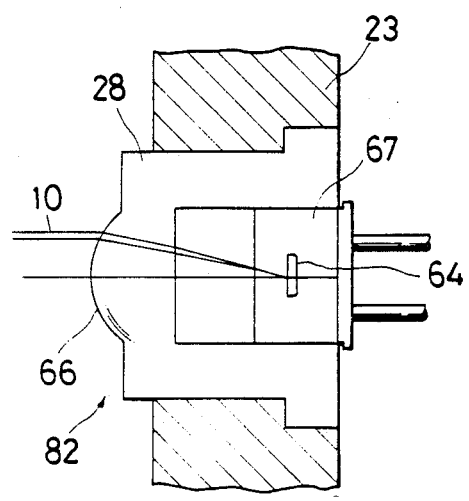
Figure 8C:
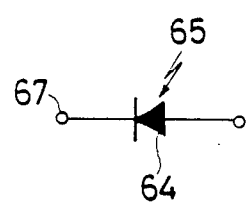

In FIGS. 8 (a) and 8 (b) there are shown a plan view and a sectional view, respectively, of the horizontally synchronized signal detector 82 shown in FIG. 3.

The horizontally synchronized signal detector 82 shown in the figures has a cylindrical form and comprises a horizontally synchronized signal element holder 28 that has at one section a projection 68 for positioning, and a horizontally synchronized signal detection element case 67, with a horizontally synchronized signal detection element 64 in its interior, which is situated on the bottom in the inside of the horizontally synchronized signal element holder 28, having in a section a projection 69 for the positioning of the horizontally synchronized signal, and a cylindrical lens 66 that has a power only in the sub-scanning direction, placed in front of the horizontally synchronized signal detection element 64.

The action of the horizontally synchronized signal detector 82 constructed as in the above will now be described.

According to the present invention, laser beam which is reflected from the horizontally synchronized signal reflecting mirror 27 is then incident upon the horizontally synchronized signal detector 82. The optical path length from the horizontally synchronized signal reflecting mirror 27 to the horizontally synchronized signal detector 82 is shorter than the ideal path length to the photosensitive body 7. However, for the beam scanning in the main scanning direction shown in FIG. 3, there is provided the horizontally synchronized signal folding lens 65 that has power only in the main scanning direction, in front of the horizontally synchronized signal reflecting mirror 27. Therefore, laser beam is converged to the horizontally synchronized signal detection element 64. For the sub-scanning direction, there is provided a cylindrical lens 66 that has power only in the sub-scanning direction as shown in FIGS. 8(a) and 8(b). Thus, for example, even when there arises a deflection of the laser beam in the sub-scanning direction, it is designed that the laser beam is converged without fail to the horizontally synchronized signal detection element 64. In the present embodiment, the horizontally synchronized signal folding lens 65 that has power only in the main scanning direction and the cylindrical lens 66 that has power only in the sub-scanning direction are provided for the horizontally synchronized signal reflecting mirror 27 and the horizontally synchronized signal detector 82, respectively. However, it may instead be arranged to provide a cylindrical lens that has power only in the main scanning direction (corresponding to the horizontally synchronized signal folding lens 65 in the above) on the rear side, that is, on the side of the horizontally synchronized signal detection element, of the cylindrical lens 66 that has power only in the sub-scanning direction, as shown in FIG. 8 (b). With such a configuration it will become possible not only to obtain horizontally synchronized signal that has satisfactory rise characteristics but also to obtain an image which is clearcut.

FIG. 8 (c) is an explanatory diagram for illustrating the conduction state of the horizontally synchronized signal detection element 64.

As shown in the figure, the horizontally synchronized signal detection element case 67 of the horizontally synchronized signal detection element 64 is made current conducting so that it is necessary to insulate it. For this reason, a lens surface is formed in a part of the horizontally synchronized signal element holder 28, and the projection 68 provided on the horizontally synchronized signal element holder 28 is fitted into the optical unit casing 23 to fix the generatrix of the cylindrical lens to a predetermined direction. In addition, the relative position of the cylindrical lens surface and the horizontally synchronized signal detection element 64 can be arranged to be set precisely. At the same time, the horizontally synchronized signal element holder 28 has a cavity which fits with the projection 69 for positioning the horizontally synchronized signal detection element 64 formed in a part of the horizontally synchronized signal detection element case 67, in order to position the main scanning direction of the laser beam to be orthogonal to the rectangular edge portion of the horizontally synchronized signal detection element 64. This is for preventing a deviation between the horizontally synchronized signal and the starting position for writing, even for a slight deflection in the sub-scanning direction of the laser beam that passes through the horizontally synchronized signal detection element 64.

FIGS. 9 (a), 9 (b), and 9 (c) are explanatory diagrams for showing the various characteristics of the optical system of the present image formation device.

FIG. 9 (a) is an explanatory diagram as seen from the direction which is perpendicular to the plane formed by the scanning beam. In FIG. 9 (a), laser beam generated by the semiconductor laser 54 reaches the photosensitive body 7 via the collimating lens 51, the first and the second prisms 56 and 57, and the first and the second scanning lenses 24 and 43.

Suppose that the focal length of the collimating lens is $f_0 = 5$ (mm) and the focal length of the first scanning lens 24 is $f_1 = 215$ (mm). The curvature in the main scanning direction of the bar-like second scanning lens 43 that is arranged in the neighborhood of the photosensitive body 7 is very small compared with the distance to the image so that the curvature may be neglected. Therefore, it may be said that the spot diameter of the laser beam in the main scanning direction depends upon the focal length $f_1$ of the first scanning lens 24, the width in the main scanning direction of the flattened collimated beam that impinges upon the first scanning lens, and the distance between the first scanning lens 24 and the photosensitive body 7. Further, the distances between the front and rear foci of the first and second scanning lenses will also be neglected for convenience. Moreover, when the beam is adjusted, it is assumed that the waist of the flattened collimated beam 58 that impinges upon the first scanning lens 24 is positioned at the reflecting surface of the polygonal mirror 22. In addition, the focal length in the sub-scanning direction, in the vicinity of the optical axis of the first scanning direction, of the second scanning lens 43 is set at $f_2 = 29$ (mm), the distance from the first scanning lens 24 to the reflecting surface of the polygonal mirror 22 is $d_2 = 48$ (mm), the distance from the first scanning lens 24 to the photosensitive body 7 ($d_2' + d_1 + d_1'$) is 211 (mm) with $d_1' = 33$ (mm). In order to make it possible to compute such optical conditions, the reflecting point of the polygonal mirror 22 and the surface of the photosensitive body 7 are placed in mutually conjugate relationship, to solve the reflecting point as a material point, and it is arranged to have the material point to be imaged on the photosensitive body 7. Namely, even when the polygonal mirror 22 is inclined from the state 71 to the state 72 in FIG. 9 (b), the laser beam propagates as shown by the broken line, so that it is arranged to focus at the same point on the photosensitive body 7 where it focuses when there is no inclination of the polygonal mirror 22. This is what represents the correction effect of the facet tilt of the polygonal mirror 22. Next, referring to FIG. 9 (c), the beam spot radius $\omega'$ in the main scanning direction on the photosensitive body 7 will be computed. In the present embodiment, the radius (what is meant here by the radius corresponds to the value of the radius where the beam intensity is reduced to $1/e^2$ of the value at the center) of the flattened collimated beam to the first scanning lens 24 is assumed to be $\omega_2' = 2$ (mm) in the main scanning direction, and $\omega_2 = 0.2$ (mm) in the sub-scanning direction. Then, the radius $\omega_0'$ and the position $Z_0$ of the beam waist in the main scanning direction brought to focus by the first scanning lens 24 are given by the following relations that are well known.

$$\omega_0' = \omega_2' \cdot f_1 / \sqrt{(d_2 - f_1)^2 + \delta^2},$$
$$Z_0 = f_1 [1 + f_1 (d_2 - f_1)/\{(d_2 - f_1)^2 + \delta^2\}],$$

Here,
$\delta = \pi \omega_2'^2 / \lambda,$ where $\lambda = 790$ (mm)

is the wavelength of the semiconductor laser. Computation by the use of the assumed values leads to $\omega_0' = 0.027$ (mm), $Z_0 = 215$ (mm).

That is, the beam waist will be formed at a point 4 (mm) behind the photosensitive body 7. Therefore, on the photosensitive body 7, the beam radius $\omega'$ at a distance $z = 4$ (mm) can be determined by the well-known equation given above. That is, from the relation $\omega'^2 = \omega_0'^2 \{1 + (\lambda z / \pi \omega_0'^2)^2\}$ it can be found that $\omega' = 0.046$ (mm).

Now, to determine the radius $\omega$ of the laser beam spot in the sub-scanning direction on the photosensitive body 7, the power $1/f_2$ in the sub-scanning direction of the second scanning lens 43 has to be taken into account also. By calling the beam waist position of the first scanning lens 24 $d_2'$ and the beam waist radius there $\omega_1$, and the beam waist position of the second scanning lens 43 $d_0'$ and the beam waist radius there $\omega_0$, one can compute $\omega_1$ and $d_2'$ in the same way as before to obtain $$\omega_1 = \omega_2 \cdot f_1 / \sqrt{(d_2 - f_1)^2 + \delta^2},$$
$$d_2' = f_1 [1 + f_1 (d_2 - f_1)/\{(d_2 - f_1)^2 + \delta^2\}],$$

where
$\delta = \pi \omega_2^2 / \lambda.$
Then, there are found that $\omega_1 = 0.186$ (mm),
$d_2' = 69.8$ (mm).
Therefore, in FIG. 9 (c) it is obtained that $d_1 = 108.2$ (mm).

By repeating the similar computation for the second scanning lens 43, one has $$\omega_0 = \omega_1 \cdot f_2 / \sqrt{(d_1 - f_2)^2 + \delta^2},$$
$$d_0' = f_2 [1 + f_2 (d_1 - f_2)/\{(d_1 - f_2)^2 + \delta^2\}],$$

where
$\delta = \pi \omega_1^2 / \lambda,$ so that there are obtained
$\omega_0 = 0.034$ (mm),
$d_0' = 31.6$ (mm).
This means that the beam waist is formed 1.4 (mm) in front of the photosensitive body 7. Accordingly, the beam spot radius in the sub-scanning direction on the photosensitive body 7 is represented by $\omega^2 = \omega_0^2 \{1 + (z/\pi \omega_0^2)^2\}.$ Substituting $z = 1.4$ (mm) in the above equation there is obtained $\omega = 0.035$ (mm).

Now, the beam spot radius in the sub-scanning direction is a factor which affects the recorded image significantly. Due to dispersion in the radiating surface of the semiconductor laser, the radius $\omega_2$ in the sub-scanning direction of the flattened collimated beam that is incident upon the first scanning lens 24 will be given a dispersion on the order of 0.1 to 0.2 (mm). As may be guessed easily from the equations shown above this affects the focusing radius $\omega_0$ due to the second scanning lens 43. For this reason, in the present invention, the collimating lens unit 21 is allowed to turn with the principal optical axis of the flattened collimated beam as the center, to set the diameter $2\omega_2$ in the sub-scanning direction of the flattened collimated beam to the first scanning lens 24 to be fixed at 0.4 (mm) all the time.

Figure 10:
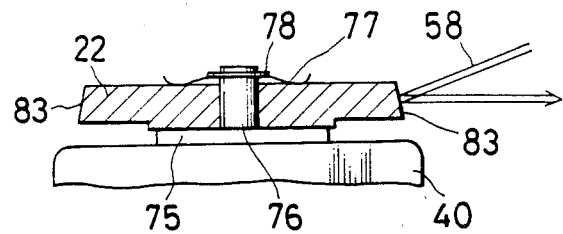
FIG. 10 is a detailed diagram for illustrating the inclination of the polygonal mirror surface shown in FIG. 4, FIG. 11 (a) is a diagram for explaining the conventional principle of correction and the amount of correction for the tilt of the polygonal mirror facet, FIG. 11 (b) is a diagram for explaining the present principle of correction for the tilting of the polygonal mirror facet FIGS. 12 (a) and 12 (b) are diagrams for explaining the relation between the first and second scanning lenses shown in FIG. 4, FIGS. 12 (c) and 12 (d) are plan view and sectional view of a modification of the second scanning lens shown in FIG. 4.

FIG. 10 shows a sectional view of the polygonal mirror 22.

In the figure, the polygonal mirror 22 is inserted from above into a polygonal mirror mounting shaft 76 which is provided at the center of a polygonal mirror mounting seat 75 that is provided in the above of a scanning motor 40 that rotates the polygonal mirror 22 at high speed. The polygonal mirror 22 is fixed to the polygonal mirror mounting shaft 76 by a polygonal mirror pressing spring 77 and a polygonal mirror pressing spring fixing ring 78 that are placed on top of the polygonal mirror 22.

Figure 11A:
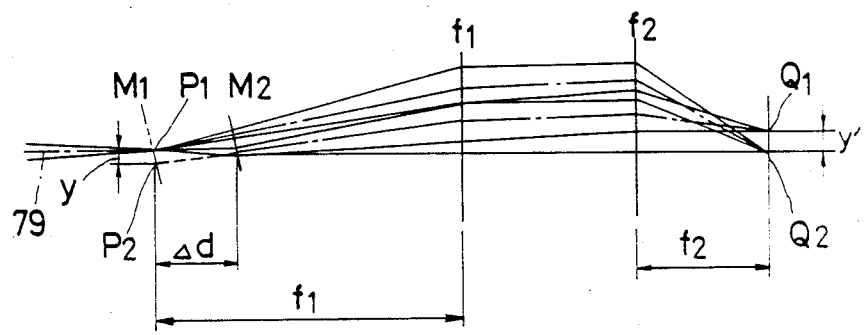
Figure 11B:
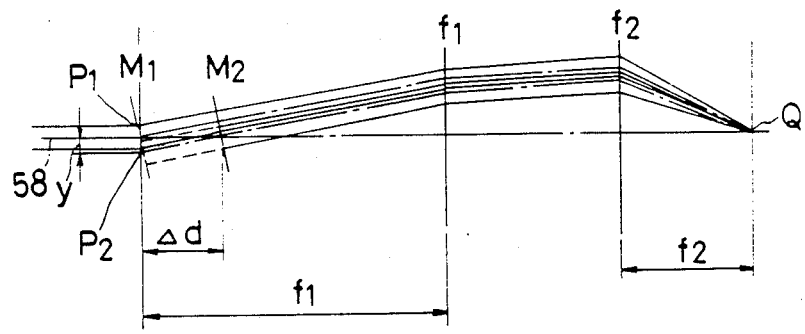

The side surfaces, namely, the respective reflecting surfaces, of the polygonal mirror 22 constructed as in the above are given slight inclination with respect to the polygonal mirror mounting shaft 76. The inclination is necessary as the slope for pulling it out from the mold for the polygonal mirror, when the polygonal mirror 22 is formed, for instance, from plastic, and is also for preventing the re-incidence on the polygonal mirror 22 of the irregularly reflected folded light from the photosensitive body 7 by passing through the first and the second scanning lenses. It prevents the problem of forming a stationary beam spot on the photosensitive body 7 which may be caused by the re-incidence of the irregularly reflected light irrespective of the rotation of the polygonal mirror. The core of the problem is that although the intensity of the light is extremely low it will be irradiated continuously over an extremely long time, for instance, for a time which is about several thousand times as long, compared with a fast and short time irradiation of the ordinary laser beam. To solve this problem, in the present image formation device, the reflecting surfaces of the polygonal mirror are given a slight tilt, to separate the optical path of the reflected light to the photosensitive body 7 due to the polygonal mirror of the irregularly reflected folded light from the photosensitive body 7, from the optical path of the original incident beam to the photosensitive body 7 and the light is arranged to be cut down by the slit for cutting down the stray light 45 as shown in FIG. 5. FIGS. 11 (a) and 11 (b) are explanatory diagrams for comparing the optical system due to the prior art and the optical system due to the present image formation device.

In the corrective optical system for the prior polygonal mirror shown in FIG. 11 (a), the laser light is converged once in the sub-scanning direction by the polygonal mirror, and it is converged again on the photosensitive body 7, that is, on the image surface, by the first scanning lens 24 and the second scanning lens 43. However, the reflecting point of light undergoes inevitable slight shift to and fro because of the precision of the multi-faceted mirror, as shown in the figure, which will become particularly conspicuous when the optical axis of the first scanning lens 24 does not intersect the incident beam orthogonally. Thus, when the reflecting point of the multi-faceted mirror is shifted by a distance d as shown in the figure, the position of convergence of the light for the reflecting position $M_2$ looks as if it is shifted for a distance of y from the point $P_1$ to the point $P_2$. As a result, the imaging point on the image surface will be shifted by a distance y' from the point $Q_2$ to the point $Q_1$. Here, they are related by the relation $y'=y(f_2/f_1)$.

However, in the present image formation device shown in FIG. 11 (b), the flattened collimated beam 58 to the multi-faceted mirror that forms a reflecting point is a parallel beam so that even when the reflecting position is shifted from $M_1$ to $M_2$, it only looks as if the position of the principal ray is shifted from the point $P_1$ to the point $P_2$, and the principal ray of the beam for both cases proceed as parallel. Therefore, for the present device, both beams form their images at the imaging point Q which is the imaging point for the case when there is no tilt of the facet of the multi-faceted mirror.

Figure 12A:
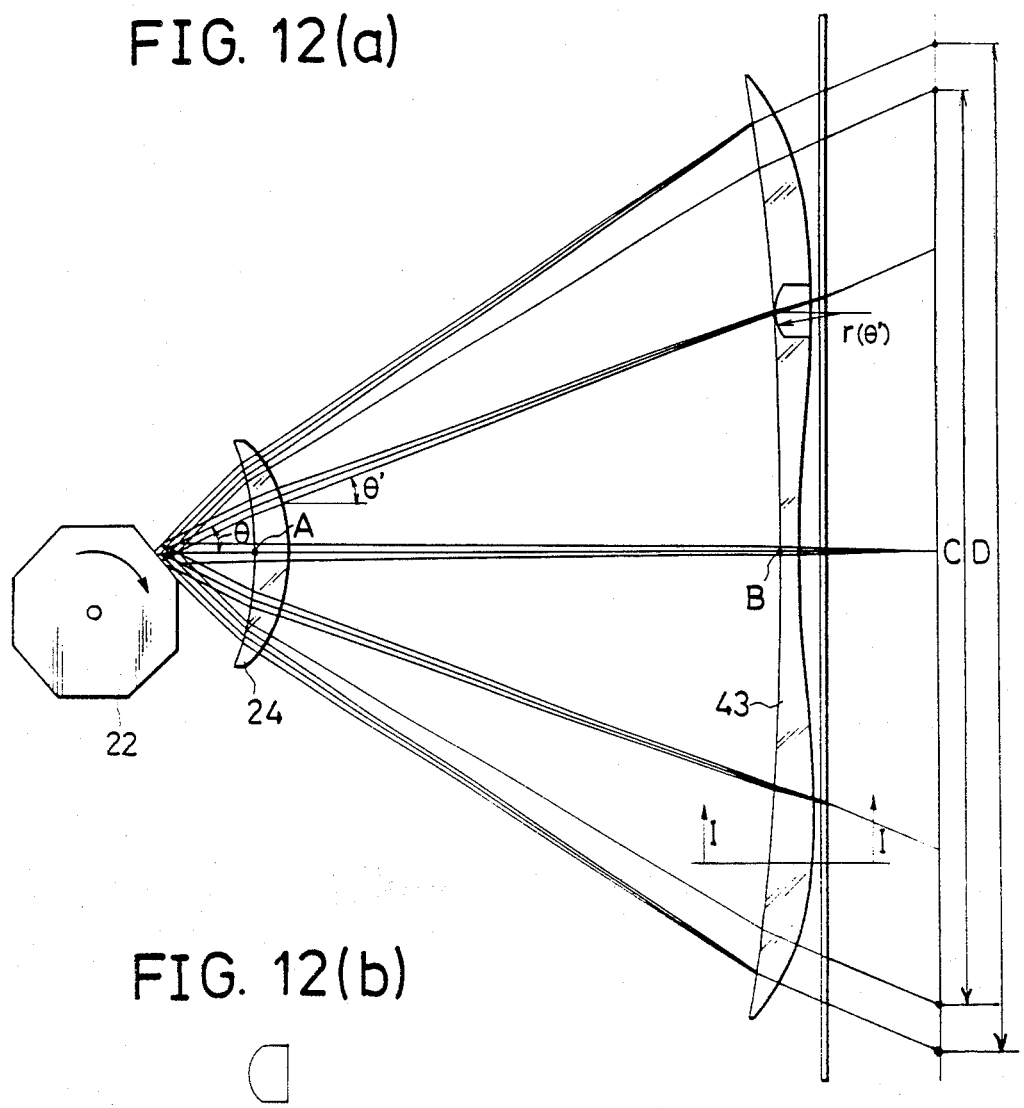
Figure 12B:

FIG. 12 (a) is a plan view of the laser scanning optical system of the present image formation device, and FIG. 12 (b) is a sectional view along the I—I line of the second scanning lens shown in FIG. 12 (a).

FIG. 12 illustrates the relationship between the first scanning lens and the second scanning lens that are particularly single lenses. In FIG. 12, the line A-B represents the optical axis of the first scanning lens 24. The second scanning lens is a bar-like lens which is convex on the side facing the photosensitive body 7, and has a curvature of $1/r_{74}$ in the sub-scanning direction on the optical axis A-B. The polygonal mirror 22 side of the second scanning lens 43 does not hold power in the sub-scanning direction, and the curvature in the sub-scanning direction is zero. Let the curvature in the sub-scanning direction, at the point where the laser beam that is emitted from the first scanning lens 24 with a slope $\theta'$ intersects the second scanning lens 43, be $1/r(\theta')$. In the figure, C represents the maximum recording width and D is the effective scanning width. The effective scanning width D is set to be larger than the maximum recording width C by at least $(f_2/f_1) \times 0.2$ (mm). Further the form on the polygonal mirror 22 side of the bar-like second scanning lens 43 is curved markedly in the main scanning direction with the optical axis A-B as the axis of symmetry, and corrects the light path so as to set the scanning distortion of the imaging point on the photosensitive body 7 to be zero.

Further, FIGS. 12 (c) and 12 (d) are a plan view and a sectional view of a modification to the second scanning lens of the laser scanning optical system.

Figure 13:
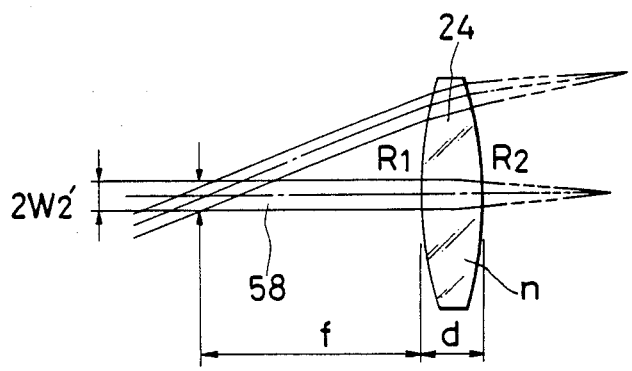
FIG. 13 is an explanatory diagram for showing the parameter of the first scanning lens shown in FIG. 4.

FIG. 13 is a detailed explanatory diagram for the optical system shown in FIG. 12.

In the figure are shown various parameters of the first scanning lens 24 in which $R_1 = -107.5$ (mm), $d=7$ (mm), $n=1.717$, and t is chosen to give an appropriate value for the bending of the image surface.

Figure 14:
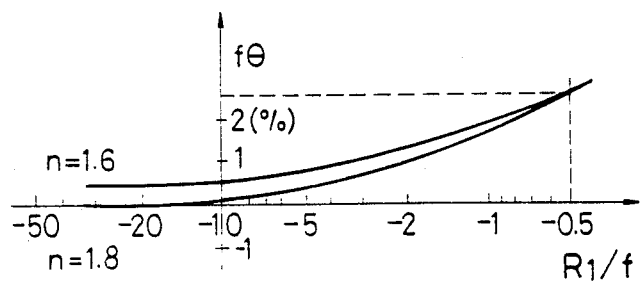
FIG. 14 is a diagram for showing the relationship between the $f\theta$ characteristic and $R_1/f$ for the first scanning lens shown in FIG. 4.

FIG. 14 is the characteristic diagram for showing the relationship between $R_1/f$ and $f\theta$ in the case of scanning angle of 20° of the first scanning lens 24 for the optical axis due to the polygonal mirror 22. In the relationship of the figure, it is seen that the distortion in the past used to be about 2 to 3%.

Figure 15:
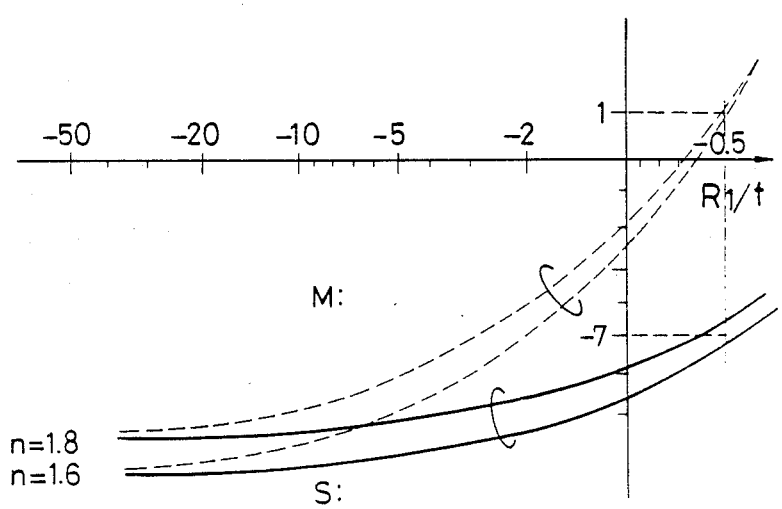
FIG. 15 is a characteristic diagram for illustrating the relationship between the bending of the image surface of the first scanning lens and $R_1/f$, FIG. 16 (a) is an explanatory diagram for showing the bending of the sagittal image surface due to prior cylindrical lens, FIG. 16 (b) is an explanatory diagram for illustrating the effects of correction for the facet tilt due to the bending of the sagittal image surface.

In FIG. 15 is shown the characteristic diagram that illustrates the relationship between $R_1/f$ and the bending of the image surface for the case of scanning angle of 20° similar to FIG. 14. In the figure, the bending of the meridional image surface is about 1 (mm) and the bending of the sagittal image surface is about 7 (mm). Therefore, when the effective scanning angle is as large as $\pm 32.5°$, both of $f\theta$ characteristic and the beam radius are not in the conditions that are practical to be used if single lens as alone are used. For this reason, to cover this drawback a cylindrical lens 80 has been used in the past as a second scanning lens along with the first scanning lens 24 which is a single lens, as shown in FIGS. 16 (a) and 16 (b).

Figure 16A:
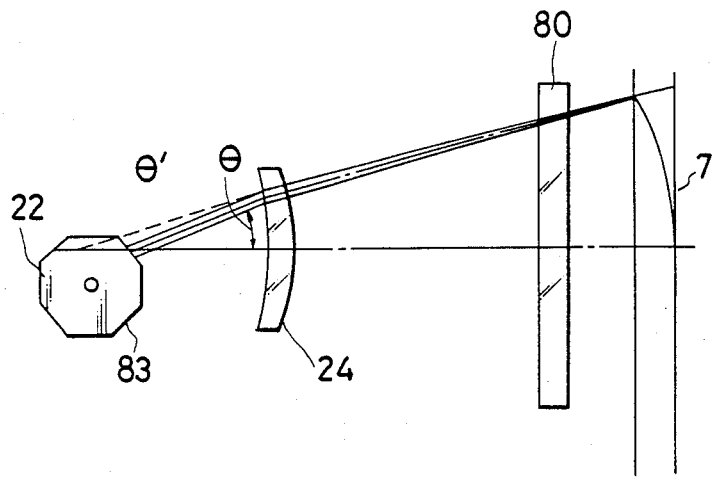
Figure 16B:
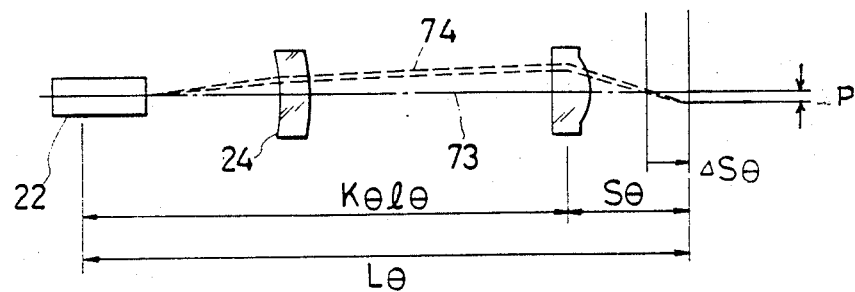
Figure 17:
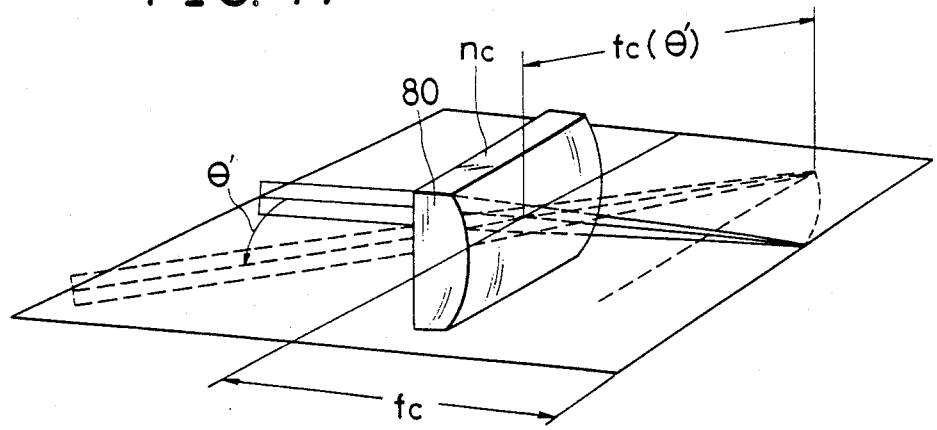
FIG. 17 is a perspective view for illustrating the details of the bending of the sagittal image surface due to the cylindrical lens.

FIG. 17 is a perspective view of an optical system that has the same dimensions as the optical system shown in FIGS. 16 (a) and 16 (b).

If the focal length of the cylindrical lens 80 for a parallel laser beam that propagates along the optical axis of the first scanning lens is $f_c$, the focal length for a parallel laser light that is incident upon the first scanning lens 24 making an angle of $\theta'$ with the optical axis is $f_c(\theta')$, and the index of refraction of the cylindrical lens 80 is $n_c$, there will hold the following relationship.

$$f_c(\theta') = \{(n_c - 1)/(\sqrt{n_c^2 - \sin^2\theta'} - \sin\theta')\} \cdot f_c \quad (1)$$

From the above relation, the bending $\Delta S_\theta$ of the sagittal image surface shown in FIG. 16 (b) is represented by $$\Delta S_\theta = [1/\{(1/A) \cdot B - C + 1\} - 1] \cdot S_\theta, \quad (2)$$

where $A = k_0 \cos\theta'$, $B = f_c/f_c(\theta')$, and $C = 1/k_\theta$.

If the scanning angle $= 20°$ and $S_0 = 25$ (mm) are substituted in these relations, then there is obtained roughly $\Delta S_\theta = -2$ (mm). However, if the scanning angle becomes as large as about $\pm 32.5°$, the bending of the sagittal image surface becomes too large. Further, the bending of the sagittal image surface becomes also a cause of reduction in the correction effect on the tilt of the polygonal mirror 22 facets, as is represented by the deviation $\Delta P$ of the beam spot position in the sub-scanning direction on the photosensitive body shown in FIG. 16 (b). Thus, in the present image formation device, the radius of curvature $r(\theta')$ of the second scanning lens corresponding to the laser beam emission angle of $\theta'$ from the first scanning lens 24, as shown in FIG. 12, is varied as a function of $\theta'$, to obtain the focal length $f_c(\theta')$ as follows.

$$f_c(\theta') = (k_\theta/k_0 \cos\theta') f_c. \quad (3)$$

That is, for a bar-like lens for which the curvature $1/r(\theta')$ in the sub-scanning direction is formed to satisfy the above condition, $\Delta S_\theta$ becomes zero, so that it becomes possible to realize a complete improvement in the bending of the sagittal image surface. Therefore, if $\Delta S_\theta$ is zero, there will not be generated $\Delta P$, as may be seen from FIG. 16 (b), and a complete correction effect for the tilt of the polygonal mirror facet can be realized, making it possible to obtain recorded images of very high quality.

If the distance between the image surface and the reflecting point for $\theta = 0$ is called $l_0$, in the above equations, there will be obtained a relation $$k_0 = 1 - S_0/l_0.$$

Further, for $\theta \neq 0$ there holds $$k_\theta = 1 - S_0/l_\theta,$$

where one can ordinarily set $l_0 \approx l_\theta$. Accordingly, since it may be set $k_0 = k_\theta$, one can regard $$f_c(\theta') = f_c/\cos\theta'.$$

In reality, however, the bending of the sagittal image surface of the first scanning lens for the case when there is no bar-like lens has also some relevance, so that $f_c(\theta')$ is determined so as to have the bending of the sagittal iamge surface to be zero for the scanning angle $\theta$, by considering the performance of the first scanning lens.

Next, the curve for the surface on the polygonal mirror 22 side of the bar-like lens 43 will be determined.

Figure 18:
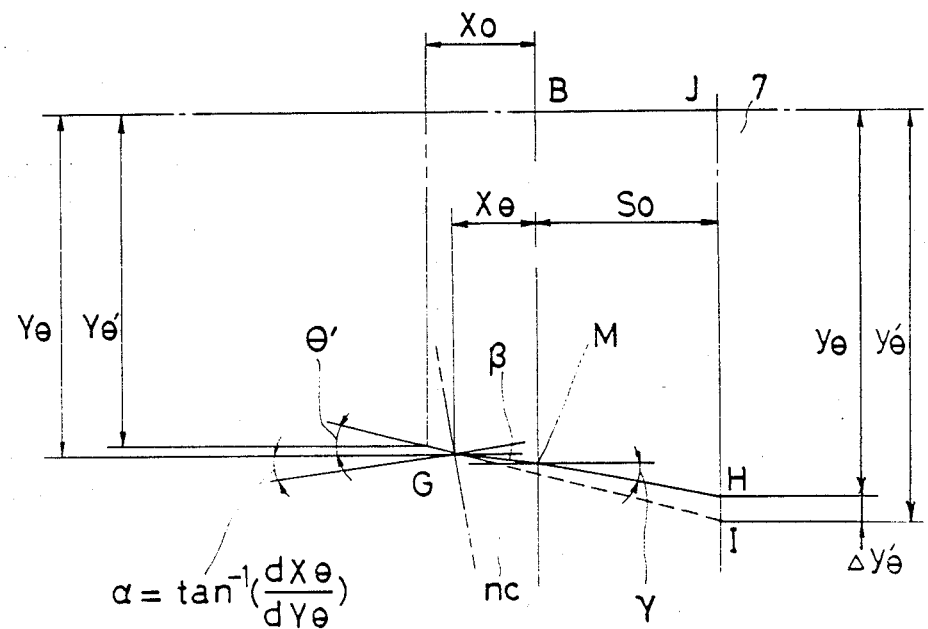
FIG. 18 is a detailed explanatory diagram for illustrating the distortion correction due to a noncylindrical bar-like lens.

FIG. 18 is an explanatory diagram for showing the relevant situation.

In the figure, the principal ray of the laser beam which is incident on the first scanning lens 24 with a scanning angle $\theta$ exits making an angle of $\theta'$ with the optical axis. The laser beam which exits from the first scanning lens with the angle $\theta'$ impinges upon the second scanning lens 43 with height $Y_\theta$. Here let the intersection of the surface which is perpendicular to the optical axis of the second scanning lens 43 at the position of the beam incidence on the optical axis of the first scanning lens 24, and the laser beam that exits the first scanning lens with the angle $\theta'$, be called $Y_\theta'$. The thickness of the second scanning lens 43 on the optical axis will be called $X_0$ the thickness at the position G where the laser beam with scanning angle $\theta$ is incident by passing through the first scanning lens 24 to the second scanning lens 43 will be called $X_\theta$, and the slope of the curved surface at the point G will be called $\alpha = \tan^{-1}(dX_0/dY_0)$. The angles before and after the refraction of the principal ray of this laser beam that is emitted from the second scanning lens at the point M will be called $\beta$ and $\alpha$, respectively. Further, the height from the optical axis of this laser beam at the position H where it impinges upon the scanned surface will be represented by $y_\theta$. In the figure, I is the point where, when the second scanning lens 43 is absent, the laser beam that is emitted from the first scanning lens 24 with the angle $\theta'$ impinges upon the scanning surface, and its height from the optical axis will be represented by $y_\theta'$.

Here, if the focal length of the first scanning lens is called $f_1$, $y_\theta$ will be represented as $y_\theta = f_1\theta$, since the curved surface on the incidence side of the second scanning lens 43 is formed to satisfy completely the $f\theta$ characteristic. Therefore, $\Delta y_\theta' = y_\theta' - y_\theta$ in the figure represents the correction to the optical path for the second scanning lens 43.

Now, in the present image formation device the laser beam emitting surface of the second scanning lens has power only in its sub-scanning direction, as described earlier, the curvature at the point where the laser beam passes through that point corresponding to the scanning angle $\theta$ is selected so as to have the bending of the sagittal image plane to be zero, and the generatrix which is a straight line keeps a distance $S_0$ between the photosensitive body 7 which is the scanning surface of the laser beam. From these relations, the curved surface on the beam incidence side of the second scanning lens for achieving the perfect $f\theta$ characteristic will now be described.

First, the equation for the image height can be represented by $$y_\theta - Y_\theta = X_\theta \tan\beta + S_\theta \tan\gamma. \quad (4)$$

Since $$Y_\theta - Y_\theta' = (X_0 - X_\theta) \tan\theta'$$

Eq. (4) above can be rewritten as $$y_\theta - Y_\theta' = (X_0 - X_\theta) \tan\theta' + X_\theta \tan\beta + S_0 \tan\gamma. \quad (5)$$

On the other hand, the law of refraction at the point M gives $$n_c \sin \beta = \sin \gamma. \tag{6}$$

Substituting Eq. (6) into Eq. (5) one has $$y_\theta - Y_\theta' = (X_0 - X_\theta) \tan \theta' + X_\theta \tan \beta + S_0 \ (F/E), \tag{7}$$

where $$E = \sqrt{1 - n_c^2 \sin^2 \beta}$$

and $F = n_c \sin \beta$. In eq. (7), $y_\theta$, $Y_\theta'$, and $0'$ represent data that can be obtained when a laser beam is passed through the first scanning lens with the scanning angle $\theta$, so that they can be determined uniquely for an arbitrary scanning angle 0. Accordingly, Eq. (7) may be regarded as a relation between an unknown $X_\theta$ and an angle $\beta$. Here, one notes that the following relation holds at the incident point G on the second scanning lens.

$$\beta = \sin^{-1} \{(1/n_c) \sin (\theta' + \alpha)\} - \alpha. \tag{8}$$

Therefore, from Eqs. (7) and (8), the relation between $X_\theta$ and $\alpha$ for a given scanning angle $\theta$ can be determined.

Now, by varying the scanning angle $\theta$ by an infinitesinal quantity, the corresponding variations of each of the variables will be represented as follows.

$$y_0, y_1, y_2, \ldots, y_i, \ldots,$$

$$Y_0', Y_1', Y_2', \ldots, Y_i', \ldots,$$

$$\theta_0', \theta_1', \theta_2', \ldots, \theta_i', \ldots,$$

$$X_0, X_1, X_2, \ldots, X_i, \ldots,$$

$$\alpha_0, \alpha_1, \alpha_2, \ldots, \alpha_i, \ldots,$$

$$\beta_0, \beta_1, \beta_2, \ldots, \beta_i, \ldots.$$

Using the above, Eqs. (7) and (8) will become as follows.

$$y_i - Y_i' = (X_0 - X_i) \tan \theta_i' + X_i \tan \beta_i + S_0 \ (H/G), \tag{9}$$

where where $G = \sqrt{1 - n_c^2 \sin^2 \beta_i}$ and $H = n_c \sin \beta_i$. In addition, and $H = n_c \sin \beta_i$. In addition, $$\beta_i = \sin \{(1/n_c) \sin (\theta_i' + \alpha_i)\} - \alpha_i. \tag{10}$$

In Eqs. (9) and (10), $y_i$, $Y_i'$, $X_0$, $\theta_i'$, $S_o$, and $n_c$ may be regarded as known quantities. Noting that $$\tan \alpha_i = (Y_i - Y_{i-1})/(X_i - X_{i-1})$$

and $$Y_i - Y_i' = (X_0 - X_i) \tan \theta_i'$$

one has $$\tan \alpha_i = (Y_i' + I - Y_{i-1})/(X_i - X_{i-1}), \tag{11}$$

where $I = (X_0 - X_i) \tan \theta_i'$. In Eqs. (9), (10), and (11), if $X_0$ and $Y_0' = 0$ are used as initial values, then Eq. (9) becomes a relation among $X_i$, $X_{i-1}$, and $Y_{i-1}$, so that when $X_{i-1}$, and $Y_{i-1}$ are determined it becomes possible to determine $X_i$. In this way, it is possible to realize the $f\theta$ characteristic with very high precision.

As described in detail in the foregoing, when the power in the sub-scanning direction of the second scanning lens 43 is employed as the combined laser beam scanning optical system of the first and the second scanning lenses, by varying the curvature in the sub-scanning direction of either one of the incidence plane or the emission plane, it becomes possible to control to eliminate the bending of the sagittal image surface. Further, by varying the curvature and slope of the main scanning direction that has very small power compared with the power in the sub-scanning direction, it becomes possible to realize the perfect $f\theta$ characteristic. This is because, by arranging a bar-like second scanning lens in the neighborhood of the photosensitive body 7 and by improving the optical characteristics of a first scanning lens that is arranged in the neighborhood of the polygonal mirror 22, it is possible to form an ideal optical scanning system through the cooperative action of the two lenses. Moreover, in the present image formation device, description was made in conjunction with the case in which the power in the sub-scanning direction of the second scanning lens is a nonconstant function of the scanning angle 0. However, even when the power in the sub-scanning direction is a constant, it is possible to improve the bending of the sagittal image surface by placing the curved surface itself of the second scanning lens close to or away from the photosensitive body 7. In addition, although the improvement in the bending of the meridional image surface was not touched upon in the foregoing description, it requires formation of the second scanning lens by taking into consideration of the thickness and the curvature of the incidence surface, that is, the power in the main scanning direction, of the second scanning lens. In other words, in the present image formation device it has been assumed that the emission surface of the second scanning lens that faces the photosensitive body 7 is a noncylindrical surface with a linear generatrix. However, the generatrix need not be limited to a straight line, and it is also possible to correct the thickness, the power in the main scanning direction, and the slope of the second scanning lens so as to improve the bending of the meridional image surface. Moreover, in the present image formation device, bending was given only to the incidence surface. However, it is not limited to this case alone, and either one of the incidence plane and the emission plane or both of them may be bent at the same time. Analogous argument applies also to the sub-scanning direction.

In summary, according to the present invention, laser beam spot may be converged on the photosensitive body by the cooperative action of the first and the second scanning lenses on the deflected laser beam, correction may be made to the optical path to have the laser beam spot scan over the photosensitive body at a constant speed. At the same time, the first scanning lens is arranged in the vicinity of the deflector and the second scanning lens is arranged in the vicinity of the photosensitive body, with the curvature in the main scanning direction of the second scaning lens given a value which is less than a fraction of the curvature in the sub-scanning direction. Accordingly, the beam deflection in the sub-scanning direction by the deflector can be corrected for effectively by the power in the sub-scanning direction of the second scanning lens that is situated in the neighborhood of the photosensitive body. In addition, the beam spot diameter in the sub-scanning direction may be squeezed properly so that the beam spot diameter in the main scanning direction can be determined by the power of the first scanning lens. On the other hand, the second scanning lens corrects the deviation from the fθ characteristic of the first scanning lens without affecting the beam spot diameter in the main scanning direction by the second scanning lens. In other words, the propagation path of the laser beam can be formed to obtain satisfactory fθ characteristic by the cooperation with the first scanning lens. By such a construction, not only satisfactory fθ characteristic can be obtained but also the second scanning lens acts to give eventual fθ characteristic, so that the burden on the first scanning lens to correct for the distortion can be reduced and hence give a very simple configuration to the first scanning lens. In addition, a flattened collimated beam is arranged to be incident upon the first scanning lens so that it is possible to prevent the decrease in the correction rate of the beam deflection by the beam deflector. Moreover, due to the fact that the slope in the main scanning direction of at least either one of the incidence plane and the emission plane is a nonconstant function of the image height in the main scanning direction, it is possible to assign to the second scanning lens, a surface inclination in the main scanning direction that corrects the deviation from the fθ characteristic due to the first scanning lens as a difference, making it possible to realize perfect fθ characteristic. Further, even when the power of the second scanning lens in the sub-scanning direction is constant, the bending of the sagittal image surface can be eliminated by changing arbitrarily the value of $S_0$ in FIG. 16 (b) to obtain a flattened collimated beam that is incident upon the first scanning lens, preventing the reduction in the correction rate due to the shift of the reflecting point in the direction of the optical axis. Next, the curvature in the sub-scanning direction of at least either one of the incidence surface and the emission surface of the second scanning lens, is a function, including the case of constant, of the image height in the main scanning direction. Therefore, it is possible to eliminate completely the bending of the sagittal image surface by properly varying the curvature of the second scanning lens in the sub-scanning direction, for various values of the image height. Because of this, it is possible to prevent the problem of generating a bending in the sagittal image surface which leads to the reduction in the input for the beam correction by the deflector, that used to be caused by the conventional cylindrical lens. In addition, the incident beam to the first scanning lens is a flattened collimated beam so that it is possible to correct completely the beam deflection caused by the shift in the reflecting point of the deflector.

Next, the incidence surface or the emission surface of the second scanning lens is a noncylindrical surface that has power only in the main scanning direction, and the power in the sub-scanning direction of the other of the incidence surface and the emission surface is a function of the image height in the main scanning direction. Therefore, by employing the noncylindrical surface that has power only in the main scanning direction, the deviation from the fθ characteristic is corrected principally by the first scanning lens, while the bending in the sagittal image surface is corrected by the other surface. By this, it becomes possible to realize the correction of the beam deflection due to the deflector, and at the same time, by separating the each of the above functions, in the case of forming the second scanning lens with, for example, plastic, the finishing of the surfaces that correspond to the respective surfaces of the plastic mold can be facilitated.

Next, the second scanning lens is formed with plastic resin so that once the mold is prepared, bar-like lens with any shape can be manufactured. In particular, in the case of the bar-like lens such as the first scanning lens, its manufacture itself becomes practically impossible if cutting or finishing has to be given each time. However, the use of plastic resin will make its manufacture extremely simple. Next, since the curvatures corresponding to the image height in the main scanning direction for the main scanning direction and for the sub-scanning direction of the second scanning lens, are given symmetrically with respect to the optical axis of the first scanning lens, it is possible to give corrections to the distortions or the image surface bendings that are symmetric with respect to the first scanning lens.

Next, the power of the first scanning lens and the power in the sub-scanning direction of the second scanning lens are given so as to have the incident laser beam reflecting point on the deflector and the image surface situated at mutually conjugate points. Therefore, even when the reflected beam is deflected in the sub-scanning direction due to deflection of the reflecting mirror such as of the deflector, the position of the image spot on the image surface is not deviated, it is possible to realize correction for the surface deflection of the reflecting mirror which is perfect. Moreover, the curvature in the sub-scanning direction that corresponds to the image height in the main scanning direction of the second scanning lens, can correct completely the bending of the sagittal image surface. In addition, deflected collimated beam is incident upon the reflecting mirror so that the beam wabbling due to the wabbling of the reflecting mirror can also be corrected perfectly by the motion of the reflecting point along the optical axis of the first scanning lens.

Various modifications will become possible for those skilled in the art after receiving the teachings of the present disclosure without departing from the scope thereof.

What is claimed is:

1. A laser beam scanning optical system for scanning a laser beam to an image carrying means in a first direction and a second direction perpendicular to the first direction by a relative motion between the laser beam and the image carrying means, comprising:
   a light source for emitting a laser beam;
   a first lens for focusing said laser beam emitted from said light source; and
   a second lens for focusing said laser beam emitted from said first lens, said second lens having a first surface facing said light source, and a second surface having curvatures changing along at least one of the first and second directions for eliminating bending of a sagittal image surface and for correcting deviation from an fθ characteristic of said first lens.

2. The laser beam scanning optical system claimed in claim 1, wherein shapes of said first and second surfaces are determined such that thicknesses between said second surface and said first surface in the second direction are different from each other along the first direction.

3. The laser beam scanning optical system claimed in claim 1, wherein distances between the first surface and a surface of the image carrying means differ from each other along the first direction.

4. The laser beam scanning optical system claimed in claim 1, wherein said lens has a power in the first direction and a power in the second direction which is at least several times stronger than the power in the first direction.

5. The laser beam scanning optical system claimed in claim 1, wherein said lens has a power in the second direction at a mid-portion thereof in the first direction and a power in the second direction at end portions thereof in the first direction less than the power at the mid-portion.

6. The laser beam scanning optical system claimed in claim 1, wherein said lens has a power in the first direction at a mid-portion in the first direction and a power in the first direction at end portions in the first direction greater than the power at the mid-portion.

7. The laser beam scanning optical system claimed in claim 1, wherein said lens is formed bar-like with plastic resin.

8. A laser beam scanning optical system for scanning a laser beam to an image carrying means in a first direction and a second direction perpendicular to the first direction by a relative motion between the laser beam and the image carrying means, comprising:
    a light source for emitting a laser beam;
    a first lens for focusing said laser beam emitted from said light source; and
    a second lens for focusing said laser beam emitted from said first lens, said second lens having a first surface facing said image carrying means, and a second surface having curvatures changing along at least one of the first and second directions for eliminating bending of a sagittal image surface and for correcting deviation from an fθ characteristic of said first lens.

9. A laser beam scanning optical system for scanning a laser beam to an image carrying means in a first direction and a second direction perpendicular to the first direction by a relative motion between the laser beam and the image carrying means, comprising:
    a light source for emitting a laser beam;
    a first lens for focusing said laser beam emitted from said light source; and
    a second lens for focusing said laser beam emitted from said first lens, said second lens having a first surface facing one of said light source and said image carrying means, and a second surface having curvatures in the second direction changing along at least one of the first and second directions for eliminating bending of a sagittal image surface and for correcting deviation from an fθ characteristic of said first lens.

10. The laser beam scanning optical system claimed in claim 9, wherein shapes of said first and second surfaces are determined such that thicknesses between said second surface and said first surface in the second direction are different from each other along the first direction.

11. The laser beam scanning optical system claimed in claim 9, wherein distances between the first surface and a surface of the image carrying means differ from each other along the first direction.

12. The laser beam scanning optical system claimed in claim 9, wherein said lens has a power in the first direction and a power in the second direction which is at least several times stronger than the power in the first direction.

13. The laser beam scanning optical system claimed in claim 9, wherein said lens has a power in the second direction at a mid-portion thereof in the first direction and a power in the second direction at end portions thereof in the first direction less than the power at the mid-portion.

14. The laser beam scanning optical system claimed in claim 9, wherein said lens has a power in the first direction at a mid-portion in the first direction and a power in the first direction at end portions in the first direction greater than the power at the mid-portion.

15. The laser beam scanning optical system claimed in claim 9, wherein said lens is formed bar-like with plastic resin.

* * * * *